No. 624,577. Patented May 9, 1899.
A. THOMPSON.
LEVEL.
(Application filed July 30, 1898.)
(No Model.)
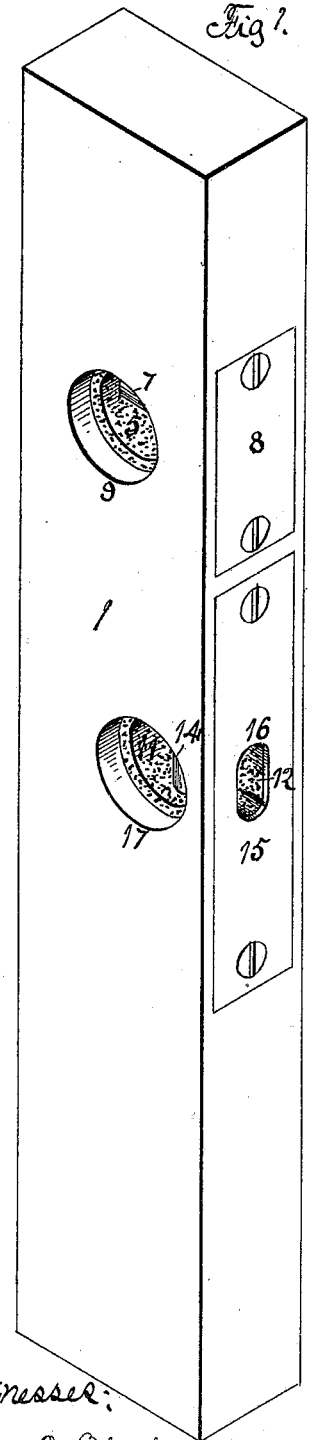
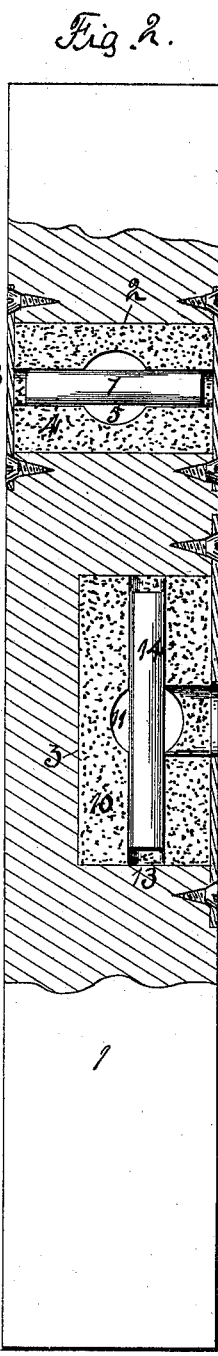
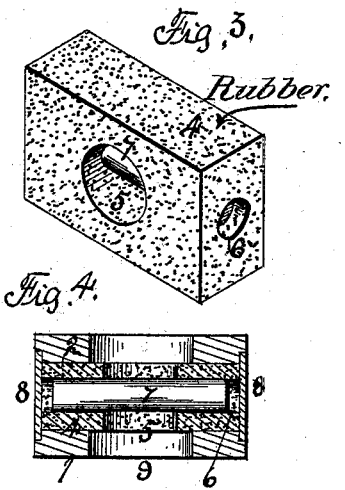
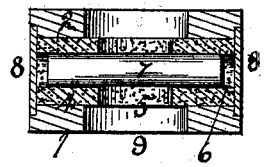
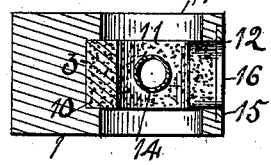
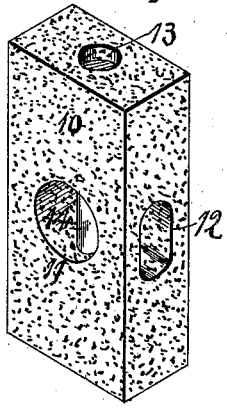
Witnesses:
Jesse C. Blake
E. Behel.
Inventor:
Abraham Thompson
By A. O. Behel
Atty.

UNITED STATES PATENT OFFICE.

ABRAHAM THOMPSON, OF ROCHELLE, ILLINOIS.

LEVEL.

SPECIFICATION forming part of Letters Patent No. 624,577, dated May 9, 1899.

Application filed July 30, 1898. Serial No. 687,357. (No model.)

*To all whom it may concern:*

Be it known that I, ABRAHAM THOMPSON, a citizen of the United States, residing at Rochelle, in the county of Ogle and State of Illinois, have invented certain new and useful Improvements in Levels, of which the following is a specification.

The object of this invention is to construct a spirit-level in which the spirit-glasses are embedded in elastic material held in place in the stock in order that they will not become broken in the rough usage of the level.

In the accompanying drawings, Figure 1 is an isometrical representation of a level embodying my improvements. Fig. 2 is a vertical section of the level through the spirit-glasses. Fig. 3 is an isometrical representation of the elastic block supporting the plumb-glass. Fig. 4 is a transverse section through the plumb-glass. Fig. 5 is a transverse section through the level-glass. Fig. 6 is an isometrical representation of the elastic block supporting the level-glass.

The stock 1 is of the usual size and shape. Near one end of the stock is mortised an opening 2, transversely of the stock, and at about midway of the length is cut a recess 3. A block 4 of rubber has a transverse circular opening 5 and a lengthwise opening 6. A spirit-glass 7 is placed within the lengthwise opening 6 and is of such diameter that it will be firmly held in position. This rubber block is placed within the opening 2 in the stock, and plates 8 are let in flush with the face of the stock and firmly clamp the rubber block in position. An opening 9 is cut through the stock and coincides with the opening 5 in the rubber block. A block 10 of rubber has a transverse circular opening 11 and a side opening 12, communicating with the circular opening. A lengthwise opening 13 is formed through the block. A spirit-glass 14 is placed within the lengthwise opening 13 and is of such diameter that it will be held firmly in position. This rubber block is placed within the recess 3 in the stock, and a plate 15 is let in flush with the face of the stock and holds the rubber block in position. An opening 17 is cut through the stock and coincides with the opening 11 in the rubber block. An opening 16 is formed in the plate 15 and coincides with the opening in the rubber block. The spirit-glass of this rubber block forms a level and the spirit-glass in the rubber block 4 forms a plumb.

By mounting the spirit-glasses in rubber blocks they are protected from the rough usage usually given to levels and the glasses will not become broken or get out of adjustment.

I claim as my invention—

In a spirit-level, a stock having two circular openings, a transverse rectangular opening and a lengthwise rectangular opening, a block of rubber for each of the rectangular openings having transverse circular openings corresponding with the circular openings in the stock and having lengthwise circular openings, a spirit-glass located in each of the lengthwise openings of the rubber blocks, the rubber block for the lengthwise rectangular opening of the stock having an opening at right angles to its circular opening and the rubber blocks held in place by metallic plates.

ABRAHAM THOMPSON.

Witnesses:
S. J. PARKER,
B. A. HOTALING.